United States Patent
Chandhok et al.

(10) Patent No.: US 6,662,212 B1
(45) Date of Patent: Dec. 9, 2003

(54) SYNCHRONIZATION OF A VIRTUAL WORKSPACE USING E-MAIL EXTENSIONS

(75) Inventors: Ravinder P. Chandhok, Waynesburg, PA (US); Kristin W. Peri, Portland, OR (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/387,142

(22) Filed: Aug. 31, 1999

(51) Int. Cl.[7] .............................................. G06F 15/16
(52) U.S. Cl. ...................... 709/206; 709/200; 709/201; 709/203; 709/204; 709/205; 709/248; 707/1; 707/10; 707/201; 714/4; 714/11
(58) Field of Search ................................ 709/203, 206, 709/236, 224, 248, 246, 201, 204, 205, 213; 707/201, 1, 513, 10, 104; 714/11, 4; 705/35, 42; 704/243

(56) References Cited

U.S. PATENT DOCUMENTS

| | | | |
|---|---|---|---|
| 5,367,698 A | * 11/1994 | Webber et al. | 709/203 |
| 5,813,007 A | * 9/1998 | Nielsen | 707/10 |
| 5,978,828 A | * 11/1999 | Greer et al. | 709/224 |
| 6,018,762 A | * 1/2000 | Brunson et al. | 709/206 |
| 6,061,740 A | * 5/2000 | Ferguson et al. | 709/246 |
| 6,148,305 A | * 11/2000 | Ikegaya et al. | 707/104 |
| 6,151,623 A | * 11/2000 | Harrison et al. | 8/402 |
| 6,161,146 A | * 12/2000 | Kley et al. | 709/248 |
| 6,175,842 B1 | * 1/2001 | Kirk et al. | 707/513 |
| 6,230,210 B1 | * 5/2001 | Davies et al. | 709/248 |
| 6,304,881 B1 | * 10/2001 | Halim et al. | 707/201 |
| 6,341,316 B1 | * 1/2002 | Kloba et al. | 709/248 |
| 6,356,948 B1 | * 3/2002 | Barnett et al. | 709/236 |
| 6,366,898 B2 | * 4/2002 | Taivalsaari et al. | 707/1 |

* cited by examiner

*Primary Examiner*—Ayaz Sheikh
*Assistant Examiner*—Thu Ha Nguyen
(74) *Attorney, Agent, or Firm*—Philip R. Wadsworth; Gregory D. Ogrod; Robert J. O'Connell

(57) ABSTRACT

A method and system for synchronizing files shared by members of a distributed workgroup through electronic mail. Electronic mail having a synchronization command embedded in multipurpose internet mail extensions is generated when a workgroup member revises a workgroup file and is sent to the other workgroup members. Upon receipt of the electronic mail containing the synchronization command, the local copy of the corresponding workgroup file resident on the computer of the recipient is synchronized to reflect the revision. Membership in the workgroup is managed through electronic mail having embedded mailer's list management command as well.

29 Claims, 5 Drawing Sheets

SYNCHRONIZATION OF A VIRTUAL WORKSPACE USING E-MAIL EXTENSIONS

BACKGROUND

I. Field of the Invention

The present invention relates generally to maintaining a synchronized multi-user collaborative environment, and more particularly to methods and systems of maintaining synchronization in a multi-user collaborative environment through the use of standard internet-formatted electronic mail.

II. Related Art

In collaborative multi-user environments, often referred to as workgroup environments, a number of users or workgroup members operating in their individual or local workspaces have access to a single computer file simultaneously. The ability to access the file in this manner typically includes the ability of each member to alter the file at any time as well. Thus, the larger the number of members in the workgroup the more critical it becomes that the individual workspaces of each member be synchronized to ensure that all users in the workgroup have access to the same version of a file.

Various methods and systems for maintaining a synchronized workgroup environment are known in the art. Many such systems involve the use of a centralized workspace wherein synchronized files are maintained in a single location but can be accessed remotely by workgroup members from their local workspaces. Software residing in the centralized workspace performs the task of synchronizing any files that have been accessed and revised simultaneously by various workgroup members in their local workspaces.

One example of such a system utilizes the internet as the means of accessing the centralized workspace. Workgroup members access files installed on a central server using internet browsers installed in their local workspaces. As the workgroup members revise copies of a shared file in their local workspaces, a software plug-in installed on their internet browser communicates those revisions to the central server via the internet. Software residing on the central server then synchronizes the file residing on the central server with the revised file located in the individual workspace. The software on the central server will also send electronic mail. In the standard configuration, a local workspace for a workgroup member must be connected to the internet while the workgroup member is working on a shared file in his local workspace. If a workgroup member wants the ability to work on a shared file while off-line from the internet, he must install additional proprietary software on the computer in his local workspace.

Another method for maintaining a synchronization in an asynchronous distributed workgroup environment involves a rudimentary use of electronic mail to communicate revisions to workgroup members. In its simplest form, a workgroup member will create in their local workspace a file to be shared with the other members of the workgroup. The workgroup member will then send copies of the shared file to the other workgroup members as an electronic mail file attachment, along with written comments or instructions regarding what has been done or is to be done with the copy of the shared file. As each member in the workgroup revises their copy of the shared document in their local workspace, they must then send a copy of their revised copy or version of the shared file to every other member of the workgroup. It is then up to the other workgroup members to notice that a revised copy of the shared file has arrived in their local workspace, and overwrite their copy of the shared file with the revised copy of the shared file or create a new version of the shared file which they will recognize as the latest version of the shared file in their local workspace. In other words, it is up to each individual workgroup member to synchronize his local workspace.

The limitations of the foregoing method are obvious, and become increasingly more limiting as the number of workgroup members increases. Particularly troubling is the scenario involving multiple workgroup members revising their copies of the shared file simultaneously. Rather than simply overwriting their copy of the shared file with the revised copy of the shared file that has arrived in their local workspace, each workgroup member must then choose which revised copy of the shared file to use as the synchronized shared file residing in their local workspace, abandoning the revisions in the other revised copies of the shared file, or create several new versions of the shared file which they will recognize as the latest versions of the shared file in their local workspace.

These problems and deficiencies are recognized and solved by the present invention in the manner described below.

SUMMARY

The present invention is directed to a method and system that allows one to maintain synchronization among shared computer files in asynchronous distributed workgroup environments without the need for a centralized workspace or centralized server, homogeneous computers in the local workspaces of workgroup members, proprietary communication protocols or dedicated network connections between members of a workgroup. A system having features of the present invention comprises a number of electronic mail servers, a number of computers capable of sending and receiving standard internet formatted electronic mail, and electronic mail user agents installed on each of the computers. Whenever one of the computers in the system receives an electronic mail message and the user agent resident on that computer detects a synchronization command embedded in the multipurpose internet mail extensions of the internet formatted message, the user agent will synchronize the shared files residing on the computer in the local workspace of that workgroup member. Some types of synchronization commands are accompanied by file attachments or additional MIME parts in the electronic mail message.

A system having features of the present invention may also generate and send to the other members of the workgroup electronic mail messages containing embedded synchronization commands whenever a workgroup member revises a shared computer file in his local workspace. A system having features of the present invention may also utilize embedded mailing list management commands to add and remove computers from the system.

BRIEF DESCRIPTION OF THE DRAWINGS

The features, objects and advantages of the present invention will become more apparent from the detailed description set forth below when taken in conjunction with the drawings, in which like reference characters identify corresponding items throughout and wherein.

DETAILED DESCRIPTION OF PREFERRED EMBODIMENTS

The present invention utilizes commands embedded in standard internet formatted electronic mail to achieve various functions in workgroup environments. Specifically, preferred embodiments of the present invention utilize commands embedded in the multipurpose internet mail extensions (MIME) of standard internet formatted electronic mail to synchronize files shared by members of a workgroup, add new members to a workgroup, and remove existing members from a workgroup. A preferred embodiment of the present invention synchronizes files shared by members of a workgroup automatically and in the background. Preferred embodiments of the present invention also address the situation where two or three workgroup members revise a local workgroup file simultaneously.

Figure 1:
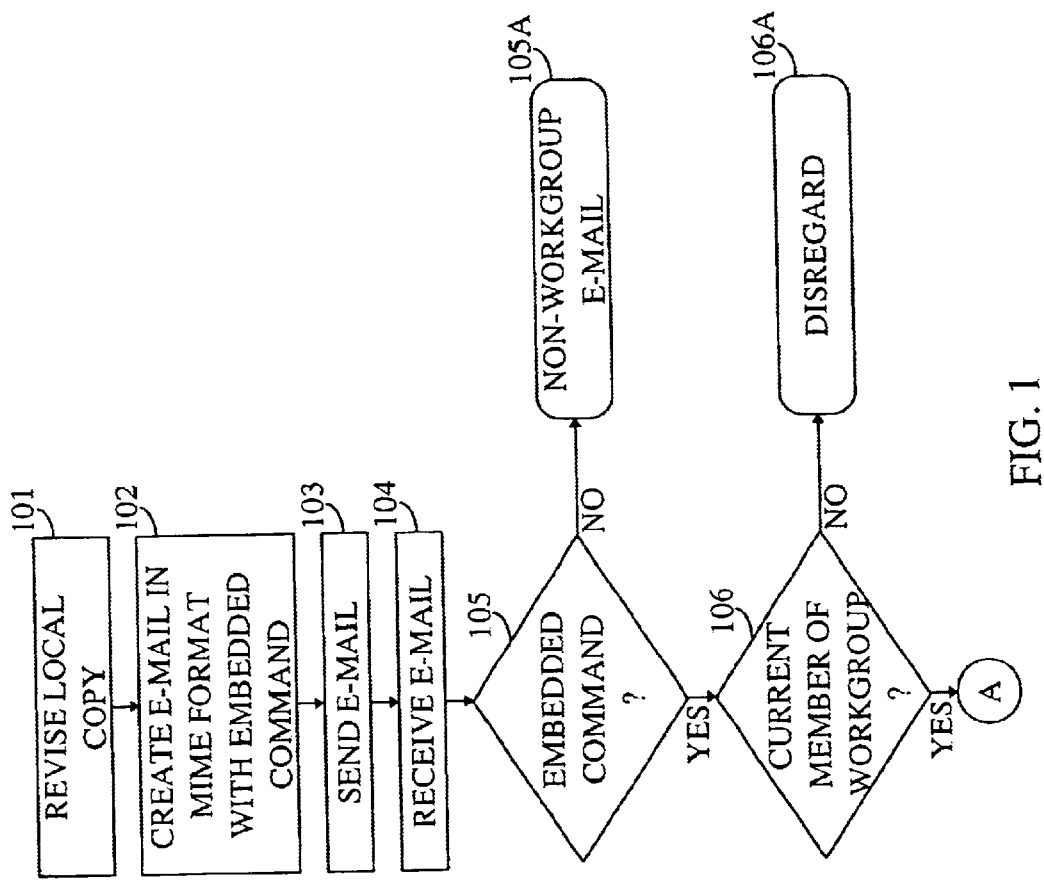
FIGS. 1 and 1A are a flow diagram of a method for automatically synchronizing computer files shared by members of a workgroup, in accordance with a preferred embodiment of the invention.
Figure 1A:
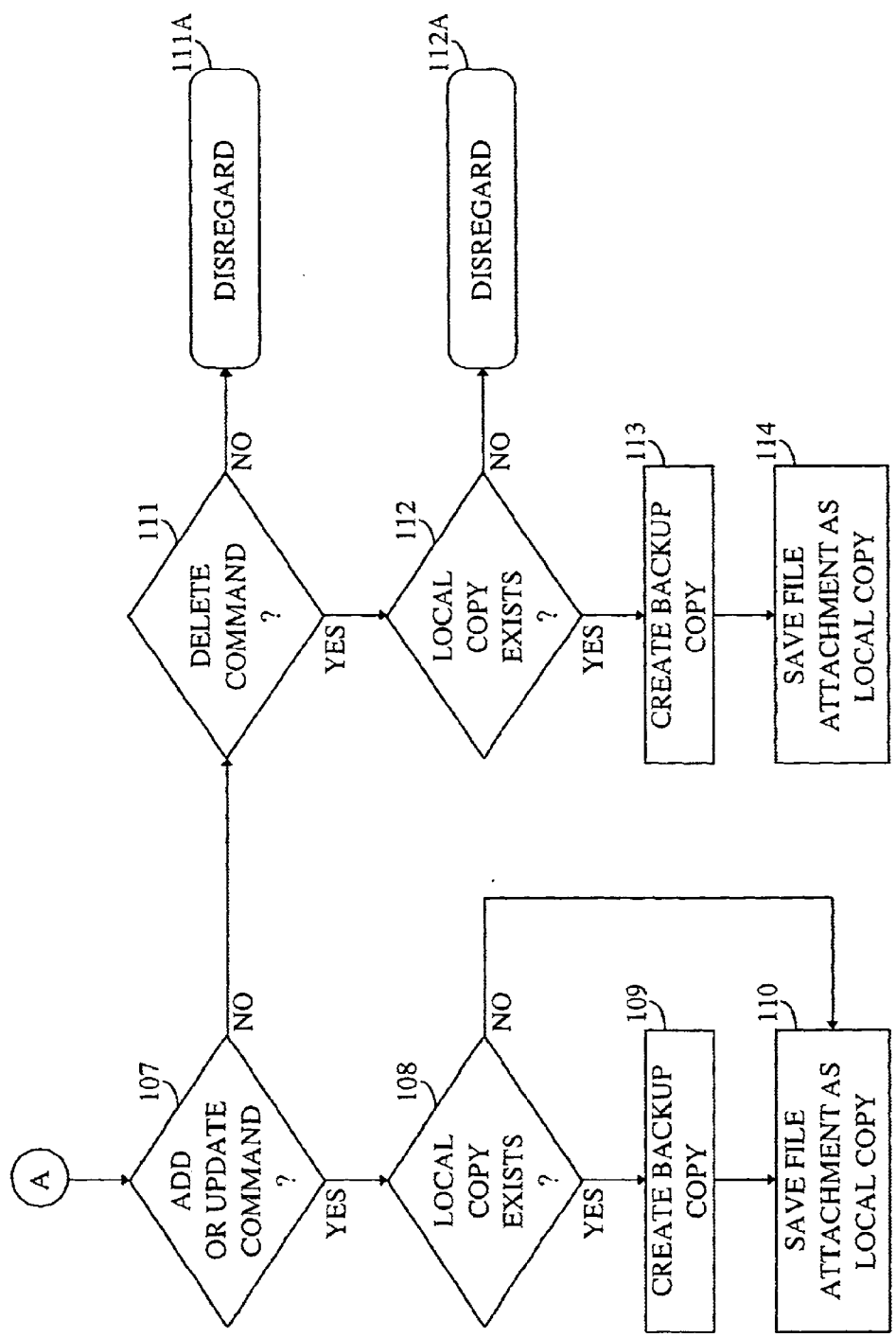

Referring now to FIGS. 1 and 1A, there is shown a flow diagram of a computer-implemented method for automatically synchronizing computer files shared by members of a distributed asynchronous workgroup according to one embodiment of the present invention. One skilled in the art will note however that the present invention is neither limited to the particular embodiments disclosed nor distributed asynchronous networks, and may be utilized with, by way of example only, synchronous networks, non-distributed networks, and various combinations thereof.

Each member of the workgroup has local copies of the shared files residing on their computer, as well as a workgroup mailing list containing the e-mail addresses of each member in the workgroup. The local copies of the files shared by the members of the workgroup are the only copies of the shared files necessary for the method. There is no need for a centralized workspace wherein the shared files reside and are accessed remotely by members, wherein copies of the shared files reside and are synchronized in that central location, or wherein a master workgroup mailing list would be maintained. Any particular member of the workgroup may also be a member of other workgroups, in which case he will have local copies of shared files and a workgroup mailing list for each of the workgroups of which he is a member. In a preferred embodiment of the invention, each workgroup member has a local workgroup folder, directory, or similar storage location, for each workgroup of which they are a member and wherein their local copies of the shared workgroup files for each workgroup reside.

Referring now to FIG. 1, the process begins in step 101 when a workgroup member revises his local copy of a workgroup file. Revisions include creating a new workgroup file, deleting a workgroup file or creating a new version of a workgroup file. Other file operations may however be considered revisions as well. In response to the file revision in step 101, the computer in step 102 automatically creates an e-mail message in MIME format with a synchronization command embedded in the MIME and attaches a copy of the revised local workgroup file to the e-mail message as a MIME file attachment or MIME part. In a preferred embodiment of the invention, the synchronization commands are embedded in the MIME formatted e-mail as MIME text header field values. Synchronization commands include add commands, corresponding to the creation of a new workgroup file; update commands, corresponding to the creation of a new version of a workgroup file; and delete commands, corresponding to the deletion of a workgroup file.

Referring still to FIG. 1, in step 103 the computer automatically queues and sends the message created in step 102 to those addresses appearing in the workgroup mailing list of that workgroup member. In step 104 another member of the workgroup receives the e-mail message created in step 102. In response to the receipt of the e-mail in step 104, the computer automatically determines whether or not there is a synchronization command embedded in the MIME of that e-mail. If there is no embedded synchronization command detected, the e-mail is treated as a normal or non-workgroup related e-mail by the computer in step 105A.

If an embedded synchronization command is detected in step 105, the computer determines in step 106 whether the recipient of that e-mail is a member of the workgroup with which the command is associated. If the recipient has information regarding the workgroup in their local workgroup list they are members of the workgroup. If the computer determines that the recipient is not a member of the workgroup, the e-mail is disregarded in step 106A and no local workgroup file operations are performed in response to the e-mail.

If the computer determines in step 106 that the recipient is a member of the workgroup, the computer determines in step 107, referring now to FIG. 1A, whether the embedded synchronization command is an add or update command. If the computer detects an add or update command, the computer determines in step 108 whether a local copy of the particular workgroup file exists in the local workgroup files of the recipient workgroup member. If a local copy of the workgroup file does exist, the computer creates a backup copy of the existing local copy of the workgroup file in step 109, and saves in step 110 the MIME file attached to the e-mail as the local workgroup file of the recipient workgroup member. The computer will typically store the backup copy in a specially designated file or storage location which can be pre-selected by the computer or system of the invention. In an alternative embodiment of the present invention, the workgroup member can set or select the number of generations of backup copies that will be kept. If the computer determines in step 108 that no local copy of the workgroup file exists, the computer skips to step 10 and saves the MIME file attached to the e-mail as the local copy of the workgroup file of the recipient workgroup member.

Referring still to FIG. 1A, if the computer determines in step 107 that the synchronization command embedded in the MIME of the e-mail is neither an add nor an update command, the computer then determines in step 111 whether the synchronization command is a delete command. If the computer determines that the command is not a delete command, the e-mail is disregarded in step 111A and no local workgroup file operations are performed in response to the e-mail.

If the computer determines in step 111 the embedded synchronization command is a delete command, the computer determines in step 112 whether a local copy of the workgroup file associated with the delete command exists in the active local workgroup files of the recipient workgroup member. If a local copy of the workgroup file does exist, the computer creates a backup copy of the local copy in step 113, and removes or deletes the local copy from the current local workgroup files of the recipient workgroup member.

The computer will typically store the backup copy in a specially designated file folder or location. If the computer determines in step 111 that no active local copy of the workgroup file associated with the delete command exists, the e-mail is disregarded in step 112A and no local workgroup file operations are performed in response to the e-mail.

According to an alternative embodiment of the present invention, each local copy of a workgroup file typically has two associated digests, a local-copy.digest and an ancestor.digest, as well as a record of the last modification time of the local copy. whenever a local copy is revised by a workgroup member in step 101 of the process noted above, the computer updates the last modification time record for the local copy to accurately reflect the time and date when the file was revised. In step 102 of the process above, the computer also creates a new local-copy.digest using a hashing algorithm and saves the existing local-copy.digest as the ancestor.digest, before generating the e-mail message containing the embedded synchronization command.

Those having skill in the art will appreciate that many different hashing algorithms may be used to generate the digests in accordance with the present invention such as the Message Digest 5 (MD5) algorithm, or others such as those discussed in Chapter 18 of "APPLIED CRYPTOGRAPHY, Protocols, Algorithms, and Source Code in C" by Bruce Schneier, $2^{nd}$ Ed. 1996, Wiley & Sons, Inc. However, the Secure Hashing Algorithm (SHA-1) defined in FIPS PUB 180-1 issued by the National Institute of Standards and Technology, and which is incorporated by reference herein, is particularly well-suited for used with the present invention. The SHA-1 algorithm takes a message or file that is less than $2^{64}$ bits in length and produces a 160-bit message digest that is designed in a way that is computationally expensive to find a text which matches a given hash. In other words, if one has an SHA-1 hash for document A, H(A), it is exceedingly unlikely that one will find a document B where H(B)=H(A). In the case of a new workgroup file being created by a workgroup member, which would ultimately generate an e-mail having an embedded add synchronization command, the local copy will have only a local-copy.digest associated with it until that local copy is revised, at which point the digests are handled as noted above in conjunction with an update.

Having created the new local-copy.digest and saved the previous local-copy digest as the ancestor.digest, the computer completes step 102 by generating an e-mail message in MIME format with an embedded synchronization command as before, with one exception. The computer includes as part of the embedded synchronization command the ancestor.digest of the revised local copy; unless the revision to the local copy in step 101 was the creation of a new workgroup file, in which case the computer includes as part of the embedded synchronization command a digest that is a copy of the local-copy.digest created for the new file.

The method proceeds as described above up to either step 108 or 112. If the result of the determination in step 108 is "Yes," indicating that a local copy of the attached workgroup file exists, the computer determines whether the digest of the workgroup file attached to the e-mail is identical to the digest of the local copy. Thus, in the case of an update command, the computer determines whether ancestor.digest =local-copy.digest; and in the case of an add command, whether digest =local-copy.digest. If the digests are identical, the add or update command is valid, a backup copy of the existing local copy is created, and the workgroup file attached to the e-mail is saved as the local copy of the workgroup file. If the digests are not identical there is a conflict, indicating that the existing local copy and the copy of the workgroup file attached to the e-mail do not have the same ancestry. The workgroup member is notified of the conflict and must then choose how to resolve the conflict. If the result of the determination in step 108 is "No," indicating that a local copy of the attached workgroup file does not exist, the attached workgroup file is saved as the local copy on the recipient's computer as before.

Referring now to step 112, if the result of the determination is "Yes," the computer determines whether the digest of the workgroup file attached to the e-mail is identical to the digest of the local copy. In other words, whether ancestor.digest =local-copy.digest. If the digests are identical, the delete command is valid, a backup copy of the existing local copy is created and the local copy of the workgroup file is deleted from the recipient's computer. If the digests are not identical there is a conflict, indicating that the existing local copy and the copy of the workgroup file attached to the e-mail do not have the same ancestry. The workgroup member is notified of the conflict and must then choose how to resolve the conflict. If the result of the determination in step 112 is "No," indicating that a local copy of the attached workgroup file does not exist, the computer disregards the e-mail and no file operations are performed on the recipient workgroup member's computer.

Exemplary add, update, and delete commands containing the foregoing digests are seen as follows:

Add

| | |
|---|---|
| Mime-Version: | 1.0 |
| Content-Type: | text/x.peanut-command |
| Workgroup-Name: | "Eudora Alpha testers" |
| Workgroup-ID: | 1951Jo |
| Workgroup-Code: | 1951390234 |
| Action: | add |
| Action-Source-Name: | "Steve Dorner" |
| Action-Source-Address: | sdorner@qualcomm.com |
| Action-Object-Name: | Eudora4.2b81–6.99PPC.sit |
| Action-Object-Path: | "/41/Eudora4.2b81–6.99PPC.sit" |
| Action-Object-Digest: | 4AA973CD4C4DAA4F61EEB-2BDBAD27316534016F |
| Action-Object-Attachment: | 10320905 |

Update

| | |
|---|---|
| Mime-Version: | 1.0 |
| Content-Type: | text/x.peanut-command |
| Workgroup-Name: | "Eudora Alpha testers" |
| Workgroup-ID: | 1951Jo |
| Workgroup-Code: | 1951390234 |
| Action: | update |
| Action-Source-Name: | "Steve Dorner" |
| Action-Source-Address: | sdorner@qualcomm.com |
| Action-Object-Name: | Eudora4.2b81–6.99PPC.sit |
| Action-Object-Path: | "/41/Eudora4.2b81–6.99PPC.sit" |
| Action-Object-Digest: | 34AA973CD4C4DAA4F61EE-B2BDBAD27316534016F |
| Action-Object-Prior-Digest: | 84983E441C3BD26EBAAE4-AA1F95129E5E54670F1 |
| Action-Object-Attachment: | 21145733 |

Delete

| | |
|---|---|
| Mime-Version: | 1.0 |
| Content-Type: | text/x.peanut-command |
| Workgroup-Name: | "Eudora Alpha testers" |
| Workgroup-ID: | 1951Jo |
| Workgroup-Code: | 1951390234 |
| Action: | delete |
| Action-Source-Name: | "Steve Dorner" |
| Action-Source-Address: | sdorner@qualcomm.com |
| Action-Object-Name: | Eudora4.2b78–5.99PPC.sit |

| | |
|---|---|
| Action-Object-Path: | "/41/Eudora4.2b78–5.99PPC.sit" |
| Action-Object-Prior-Digest: | 84983E441C3BD26EBAAE4A-A1F95129E5E54670F1 |

Those having skill in the art will appreciate that other commands and forms of the commands are possible, and that the invention is neither limited to the specific commands nor the specific forms of the commands set forth herein.

Figure 2:
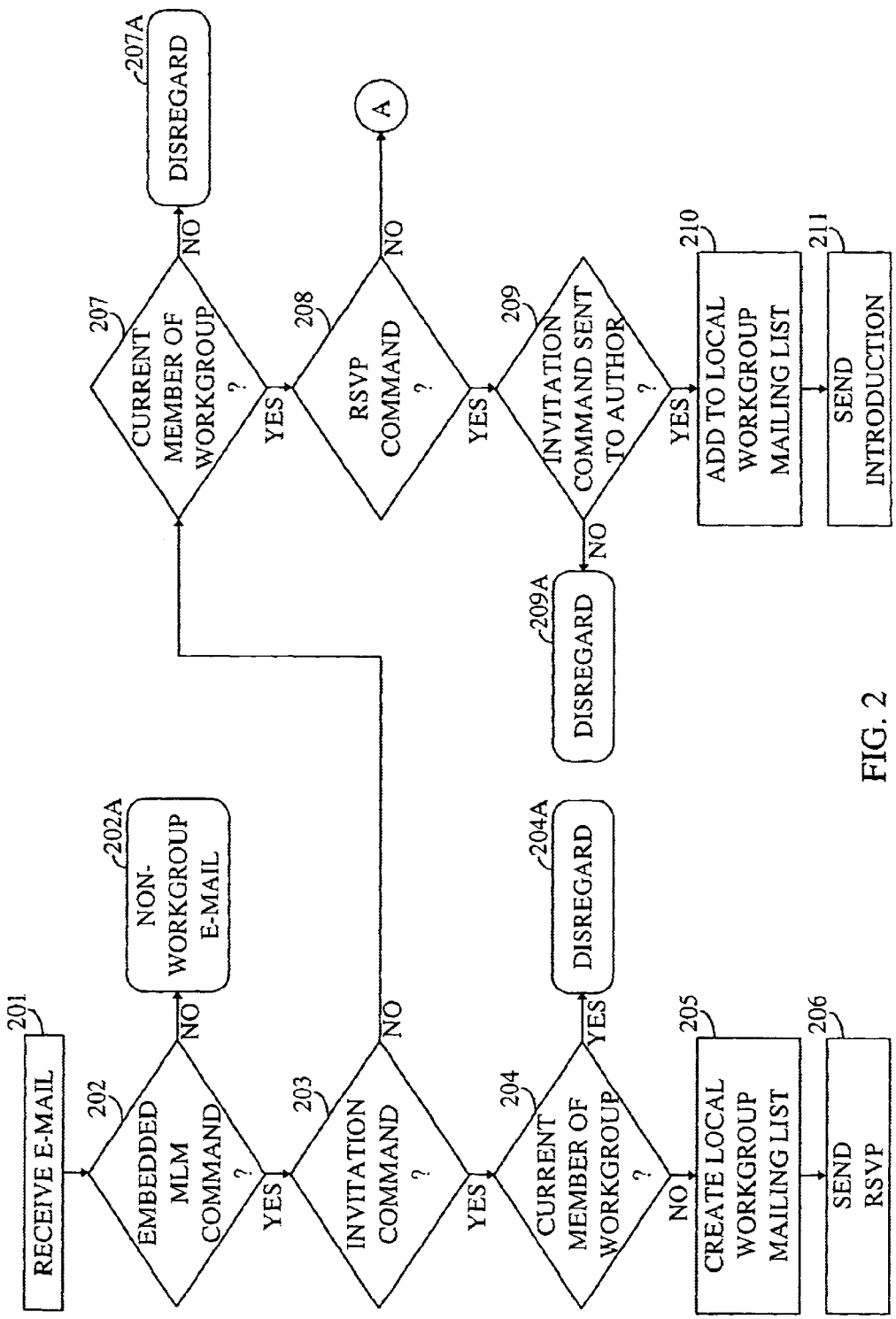
FIGS. 2 and 2A are a flow diagram of a method for adding and deleting members to a workgroup, in accordance with a preferred embodiment of the invention.
Figure 2A:
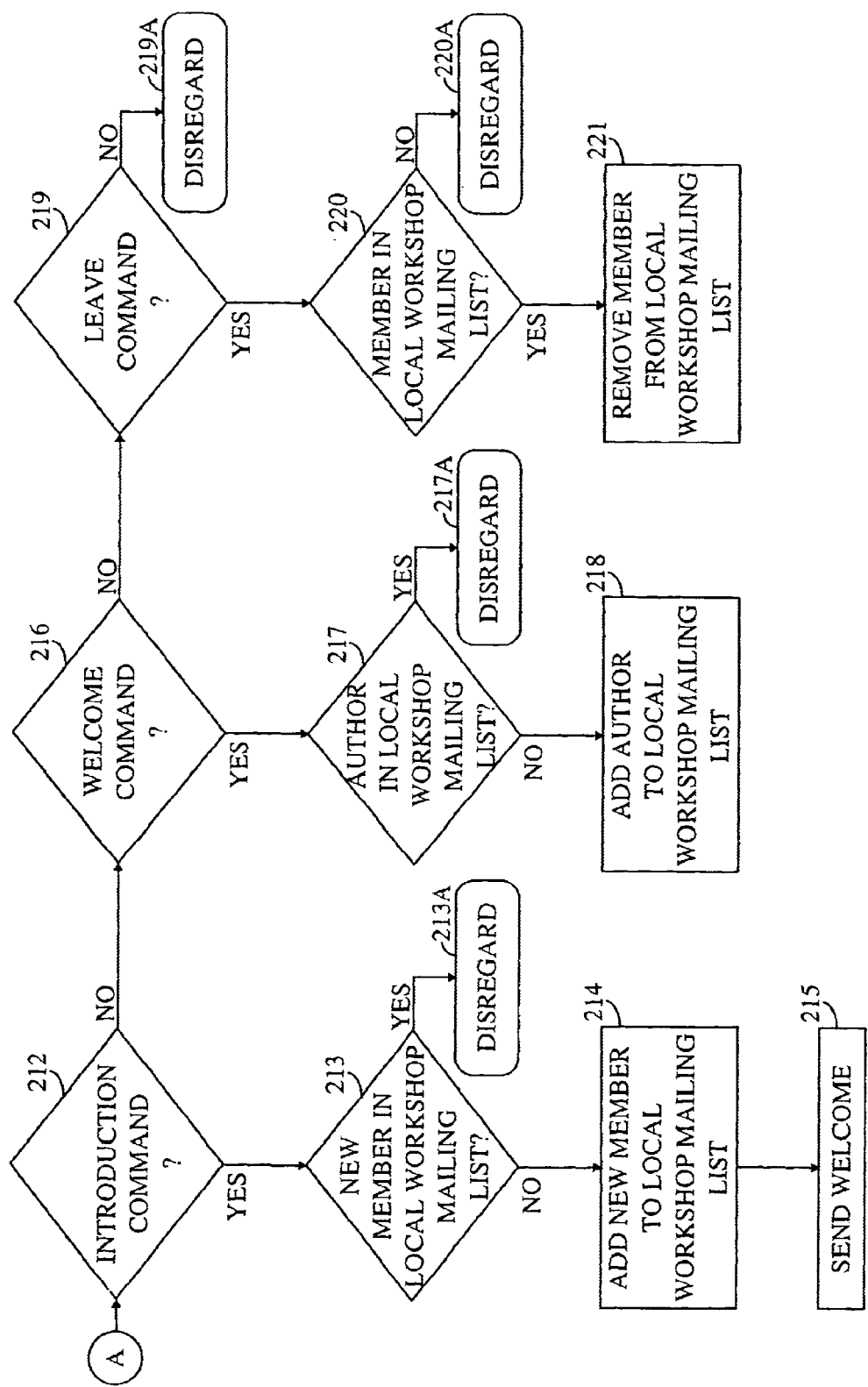

Referring now to FIGS. 2 and 2A, there is shown a flow diagram of a computer-implemented method for automatically adding new members to or removing existing members from a workgroup according to one embodiment of the present invention. Each member of the workgroup has local copies of the shared files residing on their computer, as well as a workgroup mailing list containing the e-mail addresses of each member in the workgroup. The local copies of the files shared by the members of the workgroup are the only copies of the shared files necessary for the method. There is no need for a centralized workspace wherein the shared files reside and are accessed remotely by members, wherein copies of the shared files reside and are synchronized in that central location, or wherein a master workgroup mailing list would be maintained.

Any particular member of the workgroup may also be a member of other workgroups, in which case he will have local copies of shared files and a workgroup mailing list for each of the workgroups of which he is a member. In a preferred embodiment of the invention, each workgroup member has a local workgroup folder or storage location for each workgroup of which he is a member and wherein his local copies of the shared workgroup files for each workgroup reside.

Referring to FIG. 2, the process begins in step 201 when a computer user, who may or may not be a current member of the workgroup, receives an e-mail in MIME format. In response to the receipt of the e-mail in step 201, the computer determines whether there is a mailing list management command (MLM command) embedded in the MIME of that e-mail. MLM commands include invitation commands, corresponding to an invitation to add the computer user to the workgroup; rsvp commands, corresponding to the addition of the computer user to the workgroup as a new member; introduction commands, corresponding to the introduction of the new workgroup member to the other workgroup members by the author of the invitation command; welcome commands, corresponding to the welcoming of the new member to the workgroup by the other workgroup members; and leave commands, corresponding to the removal of an existing member from the workgroup. Other MLM commands are contemplated that would correspond to other workgroup mailing list revisions. If there is no embedded MLM command detected, the e-mail is treated as a normal or non-workgroup related e-mail by the computer in step 202A. If an embedded MLM command is detected in step 202, the computer then determines in step 203 whether the MLM command is an invitation command.

Referring still to FIG. 2, if the computer detects an invitation command in step 203, the computer determines in step 204 whether the recipient of the e-mail is an existing member of the workgroup. If it is determined that the recipient of the e-mail in step 201 is an existing member of the workgroup, the e-mail is disregarded in step 204A and no operations are performed on the workgroup mailing list of the recipient workgroup member. If it is determined in step 204 that the recipient is not an existing member of the workgroup, the computer automatically creates a workgroup mailing list in step 205. In step 206, the computer then sends an e-mail in MIME format with an invitation command embedded in the MIME of that e-mail to the author of the e-mail received in step 201 that contained the invitation command. In another embodiment of the present invention, the computer notifies the new workgroup member that they have been added to the workgroup. In yet another embodiment of the invention, prior to creating the workgroup mailing in step 205, the computer notifies the recipient of the e-mail in step 201 that they have been invited to join the workgroup and queries them whether they wish to join the workgroup. Only if the recipient responds to the query in the affirmative does the computer proceed to steps 205 and 206 described above. Otherwise, the computer disregards the invitation command, and no further steps in the process would be performed.

Referring still to FIG. 2, if the computer determines in step 203 that the e-mail contains no embedded invitation command, the computer determines, in step 207, whether the recipient of the e-mail in step 201 is an existing member of the workgroup. If the recipient is not an existing member of the workgroup, the computer disregards the embedded MLM command in step 207A and exits the process. If the recipient of the e-mail is a member of the workgroup, the computer determines whether the MLM command is an rsvp command in step 208. If the MLM command is an rsvp command, the computer then determines, in step 209, whether the recipient of the e-mail previously sent an invitation command to the author of the e-mail received in step 201. If the recipient of the e-mail did not previously send an invitation command to the author of the e-mail received in step 201, the computer in step 209A disregards the rsvp command and exits the process. If the recipient of the e-mail did previously send an invitation command to the author of the e-mail received in step 201, the computer adds the author of the e-mail received in step 201 to the workgroup mailing list of the recipient in step 210. In step 211, the computer automatically creates an e-mail message in MIME format with an introduction command embedded in the MIME, queues and sends the e-mail to the other members of the workgroup. The computer may also notify the recipient that the new workgroup member has been added. In an alternative embodiment, the computer may also send copies of the current workgroup files residing on the computer (i.e., the local copies on the computer for the relevant workgroup) to the new workgroup member in step 211. Otherwise, the new workgroup member receives workgroup files in conjunction with add or update commands.

Referring still to FIG. 2, if the computer determines in step 208 that the embedded MLM command is not an rsvp command, the computer then determines, referring now to FIG. 2A, in step 212, whether the MLM command is an introduction command. If the MLM command is an introduction command, the computer determines, in step 213, whether the address of the new member being introduced appears in the workgroup mailing list of the e-mail recipient of step 201. If the address of the new member being introduced does appear in the workgroup mailing list of the e-mail recipient, the computer disregards the introduction command and exits the process in step 213A. If the address of the new member being introduced does not appear in the workgroup mailing list of the e-mail recipient, the computer adds the address of the new member to workgroup mailing list of the e-mail recipient in step 214. The computer, in step 215, automatically creates an e-mail message in MIME format with a welcome command embedded in the MIME, queues and sends the e-mail to the new member whose address was added to the workgroup mailing list in step 214. The computer may also notify the recipient that a new workgroup member has been added.

Referring still to FIG. 2A, if the computer determines in step 212 that the embedded MLM command is not an introduction command, the computer then determines whether the MLM command is a welcome command in step 216. If the MLM command is a welcome command, the computer determines, in step 217, whether the address of the author of the e-mail received in step 201 and containing the welcome command appears in the workgroup mailing list of the recipient. If the address of the author of the e-mail received in step 201 appears in the workgroup mailing list of the recipient, the computer disregards the welcome command and exits the process in step 217A. If the address of the author of the e-mail received in step 201 does not appear in the workgroup mailing list of the recipient, the computer adds the address of the author to the workgroup mailing list of the recipient in step 218.

Referring still to FIG. 2A, if the computer determines in step 216 that the embedded MLM command is not a welcome command, the computer determines whether the MLM command is a leave command in step 219. If the MLM command is not a leave command, the computer disregards the e-mail received in step 201 and exits the process in step 219A. If the MLM command is a leave command, the computer determines whether the address of the member to be removed appears in the workgroup mailing list of the recipient in step 220. If the address of the member to be removed does not appear in the workgroup mailing list of the recipient, the computer disregards the leave command and exits the process in step 220A. If the address of the member to be removed appears in the workgroup mailing list of the recipient, the computer removes the address from the workgroup mailing list of the recipient in step 221. The computer may also notify the recipient that a workgroup member has been removed.

Exemplary invitation, rsvp, introduction, welcome and removal commands in accordance with a preferred embodiment of the present invention are as follows:

| Invitation | |
|---|---|
| Mime-Version: | 1.0 |
| Content-Type: | text/x.peanut-invitation |
| Workgroup-Name: | "Eudora Alpha testers" |
| Workgroup-ID: | 1951Jo |
| Workgroup-Code: | 1951390234 |
| Workgroup-Description: | "Alpha Testing of Eudora" |
| Action: | invite |
| Action-Source-Name: | "Steve Dorner" |
| Action-Source-Address: | sdorner@qualcomm.com |
| Rsvp | |
| Mime-Version: | 1.0 |
| Content-Type: | text/x.peanut-invitation |
| Workgroup-Name: | "Eudora Alpha testers" |
| Workgroup-ID: | 1951Jo |
| Workgroup-Code: | 1951390234 |
| Action: | rsvp |
| Action-Source-Name: | "Rob Chandhok" |
| Action-Source-Address: | chandhok@within.com |
| Introduction | |
| Mime-Version: | 1.0 |
| Content-Type: | text/x.peanut-invitation |

-continued

| | |
|---|---|
| Workgroup-Name: | "Eudora Alpha testers" |
| Workgroup-ID: | 1951Jo |
| Workgroup-Code: | 1951390234 |
| Workgroup-Description: | "Alpha Testing of Eudora" |
| Action: | introduce |
| Action-Source-Name: | "Steve Dorner" |
| Action-Source-Address: | sdorner@qualcomm.com |
| Action-Target-Name: | "Rob Chandhok" |
| Action-Target-Address: | chandhok@within.com |
| Welcome | |
| Mime-Version: | 1.0 |
| Content-Type: | text/x.peanut-invitation |
| Workgroup-Name: | "Eudora Alpha testers" |
| Workgroup-ID: | 1951Jo |
| Workgroup-Code: | 1951390234 |
| Workgroup-Description: | "Alpha Testing of Eudora" |
| Action: | welcome |
| Action-Source-Name: | "Rob Chandhok" |
| Action-Source-Address: | chandhok@within.com |
| Leave | |
| Mime-Version: | 1.0 |
| Content-Type: | text/x.peanut-invitation |
| Workgroup-Name: | "Eudora Alpha testers" |
| Workgroup-ID: | 1951Jo |
| Workgroup-Code: | 1951390234 |
| Workgroup-Description: | "Alpha Testing of Eudora" |
| Action: | leave |
| Action-Source-Name: | "Rob Chandhok" |
| Action-Source-Address: | chandhok@within.com |

Those having skill in the art will appreciate that other commands and forms of the commands are possible, and that the invention is neither limited to the specific commands nor the specific forms of the commands set forth herein.

Figure 3:
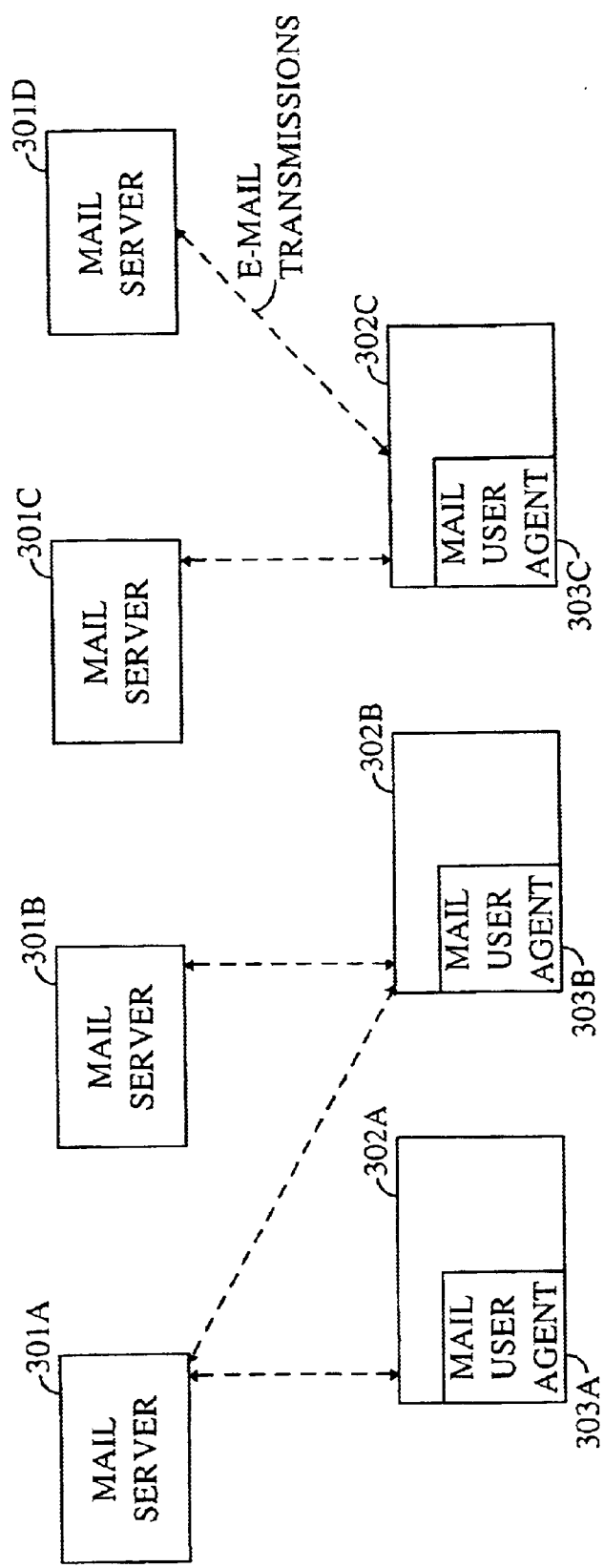
FIG. 3 is a block diagram showing the components of a system for automatically synchronizing computer files shared by members of a workgroup, in accordance with a preferred embodiment of the invention.

Referring now to FIG. 3, there is a block diagram showing the components of a system for automatically synchronizing computer files shared by members of a workgroup, and adding members to and removing members from a workgroup with commands embedded in the MIME of standard internet formatted mail in accordance with a particular embodiment of the invention. The e-mail transmissions between members of a workgroup in the methods described above are represented by the dashed lines between components 301A–D and 302A–C. Components 301A–D are standard internet mail servers such as POP or IMAP servers. Components 302A–302C are the computers of the various workgroup members, and each has the hardware necessary to send e-mail to and receive e-mail from one or more of the mail servers 301A–D. Components 303A–C, referred to as mail user agents, represent the software packages residing on the user computers 302A–C that actually perform many of the operations in the methods described above. While there must be at least one mail server and at least two workgroup members, and there must be a mail user agent installed on each computer in the system, the number of computers and mail servers in the system is otherwise unlimited.

The preceding description of the preferred embodiments of the invention is provided to enable any person skilled in the art to make and use the invention. The various modifications these embodiments will be readily apparent to those skilled in the art, and the generic principles defined herein may be applied to other embodiments without the exercise of inventive faculty. Thus, the present invention is not intended to be limited to the methods and systems shown and discussed herein but is to be accorded the widest scope consistent with the claims set forth below.

What we claim as our invention is:

1. A system for synchronizing shared computer files comprising:
   (a) at least one electronic mail server;
   (b) a plurality of computers, wherein each of said computers is capable of sending and receiving electronic mail having multipurpose internet mail extensions to and from one of said electronic mail servers, and wherein local copies of said shared computer files reside on said computers; and
   (c) electronic mail user agents installed on each of said plurality of computers, wherein each of said electronic mail user agents synchronizes said local copies in response to synchronization commands embedded within said multipurpose internet mail extensions of said electronic mail received by said computers from said electronic mail server,
      wherein a first user agent residing on a first computer in said system generates and sends to each of the other user agents in said system a first electronic mail whenever a first local copy residing on said first computer is revised, said first electronic mail having an embedded synchronization command,
      wherein said local copies each have an associated file digest, said digest being updated whenever said local copies are revised,
      wherein said digests are hashes of said local copies, and wherein said hashes are created with the SHAP-1 algorithm.

2. A system for synchronizing shared computer files comprising:
   (a) at least one electronic mail server;
   (b) a plurality of computers, wherein each of said computers is capable of sending and receiving electronic mail having multipurpose internet mail extensions to and from one of said electronic mail servers, and wherein local copies of said shared computer files reside on said computers; and
   (c) electronic mail user agents installed on each of said plurality of computers, wherein each of said electronic mail user agents synchronizes said local copies in response to synchronization commands embedded within said multipurpose internet mail extensions of said electronic mail received by said computers from said electronic mail server,
      wherein a first user agent residing on a first computer in said system generates and sends to each of the other user agents in said system a first electronic mail whenever a first local copy residing on said first computer is revised, said first electronic mail having an embedded synchronization command,
      wherein said local copies each have an associated file digest, said digest being updated whenever said local copies are revised,
      wherein said user agents retain a copy of the preceding digest whenever said local copies are revised, and
      wherein said local copies are automatically synchronized only if said local copy digests equal said ancestor digests contained in said synchronization commands.

3. A system for synchronizing shared computer files comprising:
   (a) at least one electronic mail server;
   (b) a plurality of computers, wherein each of said computers is capable of sending and receiving electronic mail having multipurpose internet mail extensions to and from one of said electronic mail servers, and wherein local copies of said shared computer files reside on said computers; and
   (c) electronic mail user agents installed on each of said plurality of computers, wherein each of said electronic mail user agents synchronizes said local copies in response to synchronization commands embedded within said multipurpose internet mail extensions of said electronic mail received by said computers from said electronic mail server,
      wherein computers may be added to or removed from said system in response to mailing list management commands embedded within said multipurpose internet mail extensions of said electronic mail received by each of said computers in said system,
      wherein a new computer may be added to said system only if said mailing list management command is embedded within the multipurpose internet mail extension of electronic mail sent by a computer presently in said system, and
      wherein said new computer may added to said system only if a positive reply to said electronic mail sent by a computer presently in said system is received by said computer presently in said system from said new computer.

4. The system of claim 3 wherein said computer presently in said system automatically introduces said new computer to each of the other computers presently in said system by sending electronic mail having multipurpose internet mail extensions.

5. A method of synchronizing computer files shared by members of a workgroup, copies of said files residing on the computers of said workgroup members as local workgroup files, said computers being capable of sending and receiving electronic mail having multipurpose internet mail extensions, comprising the steps of:
   (A) receiving electronic mail having multipurpose internet mail extensions;
   (B) determining, in response to said receipt of said electronic mail, whether said multipurpose internet mail extensions contain an embedded synchronization command; and
   (C) synchronizing, in response to said embedded synchronization command, said local workgroup files,
      wherein said electronic mail has a multipurpose internet mail extensions file attachment when said synchronization command is an add command or an update command, and
      wherein step (B) comprises the steps of:
         (i) determining, in response to said receipt of said electronic mail, whether the recipient of said electronic mail is a member of said workgroup; and
         (ii) determining, in response to a positive determination that said recipient is a member of said workgroup, whether said multipurpose internet mail extensions contain an embedded synchronization command.

6. The method of claim 5 wherein step (C) comprises the steps of:
   (i) determining, in response to said embedded synchronization command, whether said command is an add command or an update command; and
   (ii) saving, in response to said add or update command, said file attachment as one of said local workgroup files.

7. The method of claim 5 wherein step (C) comprises the steps of:
  (i) determining, in response to said embedded synchronization command, whether said command is an add command or an update command;
  (ii) determining, in response to said add or update command, whether a version of said file attachment already exists as a local workgroup file;
  (iii) creating, in response to a positive determination that a version of said file attachment already exists as a local workgroup file, a backup copy of said existing local workgroup file; and
  (iv) saving said file attachment as one of said local workgroup files.

8. The method of claim 7 wherein step (iv) comprises replacing said existing local workgroup file with said file attachment in response to the creation of said backup copy in step (iii).

9. The method of claim 7 wherein step (iv) comprises saving said file attachment as a new local workgroup file in response to a negative determination in step (ii) that a version of said file attachment already exists as a local workgroup file.

10. A method of synchronizing computer files shared by members of a workgroup, copies of said files residing on the computers of said workgroup members as local workgroup files, said computers being capable of sending and receiving electronic mail having multipurpose internet mail extensions, comprising the steps of:
  (A) receiving electronic mail having multipurpose Internet mail extensions;
  (B) determining, in response to said receipt of said electronic mail, whether said multipurpose internet mail extensions contain an embedded synchronization command; and
  (C) synchronizing, in response to said embedded synchronization command, said local workgroup files,
    wherein step (B) comprises the steps of:
      (i) determining, in response to said receipt of said electronic mail, whether the recipient of said electronic mail is a member of said workgroup; and
      (ii) determining, in response to a positive determination that said recipient is a member of said workgroup, whether said multipurpose internet mail extensions contain an embedded synchronization command.

11. The method of claim 10 wherein step (C) comprises the steps of
  (i) determining, in response to said embedded synchronization command, whether said command is a command to delete one of said computer files from said local workgroup files; and
  (ii) deleting, in response to said delete command, said one of said computer files from said local workgroup files.

12. The method of claim 11 wherein step (ii) comprises the steps of:
  (a) determining, in response to a positive determination that said embedded synchronization command is a delete command, whether a version of said one of said computer files exists as a local workgroup file;
  (b) creating, in response to a positive determination that a version of said one of said computer files exists as a local workgroup file, a backup copy of said existing local workgroup file; and
  (c) deleting said existing computer file from said local workgroup files.

13. A method for automatically synchronizing computer files shared by members of a workgroup, copies of said computer files residing on the computers of said workgroup members as local workgroup files, said computers being capable of sending and receiving electronic mail having multipurpose internet mail extensions, comprising the steps of:
  (A) revising a first local workgroup files, said first local workgroup file residing on the computer of a first workgroup member;
  (B) creating, in response to said revising, a first electronic mail having multipurpose internet mail extensions, said multipurpose internet mail extensions containing an embedded synchronization command, said first electronic mail having a multipurpose internet mail extensions file attachment when said synchronization command is an add command or an update command;
  (C) sending said first electronic mail to a second member of said workgroup;
  (D) receiving said first electronic mail by said second member of said workgroup;
  (E) determining, in response to said receiving, whether said multipurpose internet mail extensions of said first electronic mail contain an embedded synchronization command; and
  (F) synchronizing, in response to said embedded synchronization command, a second local workgroup file corresponding to said first local workgroup file, said second local workgroup file residing on the computer of said second member of said workgroup,
    wherein said local workgroup files each have an associated file digest, said digest being update whenever said local workgroup files are revised,
    wherein said digest is a hash of said local workgroup file, and
    wherein said hash is created with SHA-1 algorithm.

14. A method for automatically synchronizing computer files shared by members of a workgroup, copies of said computer files residing on the computer of said workgroup members as local workgroup files, said computers being capable of sending and receiving electronic mail having multipurpose internet mail extensions, comprising the steps of:
  (A) revising a first local workgroup file, said first local workgroup file residing on the computer of a first workgroup member;
  (B) creating, in response to said revising, a first electronic mail having multipurpose internet mail extensions, said multipurpose internet mail extensions containing an embedded synchronization command, said first electronic mail having a multipurpose internet mail extensions file attachment when said synchronization command is an add command or an update command;
  (C) sending said first electronic mail to a second member of said workgroup;
  (D) receiving said first electronic mail by said second member of said workgroup;
  (E) determining, in response to said receiving, whether said multipurpose internet mail extensions of said first electronic mail contain an embedded synchronization command; and
  (F) synchronizing, in response to said embedded synchronization command, a second local workgroup file corresponding to said first local workgroup file, said second local workgroup file residing on the computer of said second member of said workgroup, wherein said synchronization command contain a copy of the ancestor digest when said synchronization command comprises an add command, an update command or a delete command, and wherein said second local workgroup file is automatically synchronized only if the digest of said second local workgroup file equals said ancestor digest.

15. The method of claim 14 wherein said second workgroup member chooses whether to synchronize said second local workgroup file when the digest of said second local workgroup file does not equal the digest of said first local workgroup file.

16. A method of managing membership in a workgroup with electronic mail, said electronic mail having multipurpose internet mail extensions, the workgroup members of said workgroup having local workgroup files and local workgroup mailing lists residing on the computers of said workgroup members, comprising the steps of:

(A) receiving a first electronic mail;

(B) determining whether said multipurpose internet mail extensions of said first electronic mail contain an embedded mailing list management command;

(C) determining, in response to a positive determination in step (B), whether said mailing list management command is an invitation command;

(D) determining, in response to a positive determination in step (C), whether the recipient of said first electronic mail is an existing member of said workgroup; and (E) adding, in response to a negative determination in step (D), said recipient of said first electronic mail to said workgroup, said adding comprising the creation of a local workgroup mailing list on the computer of said recipient of said first electronic mail.

17. The method of claim 16 further comprising the step of:

(F) sending to the author of said first electronic mail a second electronic mail, said second electronic mail having an embedded rsvp.

18. The method of claim 17 further comprising the steps of:

(G) determining, in response to a negative determination in step (C), whether the recipient of said first electronic mail is an existing member of said workgroup;

(H) determining, in response to a positive determination in step (G), whether said mailing list management command is an rsvp command;

(I) determining, in response to a positive determination in step (H), whether said recipient of said first electronic mail sent an invitation to the author of said first electronic mail; and (J) adding, in response to a positive determination in step (I), said author of said first electronic mail to the local workgroup mailing list of said recipient as a new member of said workgroup.

19. The method of claim 16 further comprising the step of:

(K) sending, in response to said adding in step (J), a second electronic mail to said members of said workgroup, said second electronic mail having an embedded introduction command.

20. The method of claim 16 further comprising the steps of:

(L) determining, in response to a negative determination in step (H), whether said mailing list management command is an introduction command;

(M) determining, in response to a positive determination in step (L), whether said new workgroup member appears in the local workgroup mailing list of said recipient of said first electronic mail; and (N) adding, in response to a negative determination in step (M), said new workgroup member to said local workgroup mailing list of said recipient of said first electronic mail.

21. The method of claim 20 further comprising the step of:

(O) sending, in response to said adding in step (N), a second electronic mail to said members of said workgroup, said second electronic mail having an embedded welcome command.

22. The method of claim 20 further comprising the steps of:

(P) determining, in response to a negative determination in step (L), whether said mailing list management command is a welcome command;

(Q) determining, in response to a positive determination in step (P), whether the author of said first electronic mail appears in the local workgroup mailing list of said recipient of said first electronic mail; and (R) adding, in response to a negative determination in step (Q), said author of said first electronic mail to said local workgroup mailing list of said recipient of said first electronic mail.

23. The method of claim 16 comprising the additional steps of:

(S) determining, in response to a negative determination in step (C), whether said mailing list management command is a leave command;

(T) determining, in response to a positive determination in step (S), whether the workgroup member to be removed appears in the local workgroup mailing list of the recipient of said first electronic mail; and (U) removing, in response to a positive determination in step (T), said workgroup member to be removed from said local workgroup mailing list of said recipient of said first electronic mail.

24. The method of claim 16 wherein said mailing list management commands are embedded within the header fields of said multipurpose internet mail extensions as header field values.

25. The method of claim 24 wherein said header field values are header subtype values.

26. The method of claim 25 wherein said header subtype values are media subtype field values.

27. The method of claim 24 wherein said header fields are Content-Type header fields.

28. The method of claim 27 wherein said Content-Type header fields are discrete media type header fields.

29. The method of claim 28 wherein said discrete media type header fields are text header fields.

* * * * *